United States Patent
Steiner et al.

[11] Patent Number: 6,157,295
[45] Date of Patent: Dec. 5, 2000

[54] METHOD AND APPARATUS FOR DETERMINING OSCILLATION VALUES AND OTHER VEHICLE-SPECIFIC QUANTITIES OF A VEHICLE

[75] Inventors: Peter Steiner, Schrobenhausen; Guido Wetzel, Neuburg/Do; Michael Bischoff, Adelschlag, all of Germany

[73] Assignee: DaimlerChrysler AG, Stuttgart, Germany

[21] Appl. No.: 09/317,473

[22] Filed: May 24, 1999

[30] Foreign Application Priority Data

May 22, 1998 [DE] Germany ............ 198 23 093

[51] Int. Cl.[7] ............................................. B60Q 1/00
[52] U.S. Cl. .................. 340/440; 340/429; 340/689; 280/5.5
[58] Field of Search .................... 340/429, 440, 340/669, 689; 200/52 A, 61.48, 61.52, 61.45 R; 180/41, 282, 290; 701/37; 280/5.5, 5.508, 5.513

[56] References Cited

U.S. PATENT DOCUMENTS

| | | | |
|---|---|---|---|
| 3,807,678 | 4/1974 | Karnopp et al. | 248/562 |
| 4,069,767 | 1/1978 | Glaze | 105/164 |
| 5,101,355 | 3/1992 | Wada et al. | 701/37 |
| 5,131,676 | 7/1992 | Kii et al. | 280/5.5 |
| 5,180,986 | 1/1993 | Swartz et al. | 324/660 |
| 5,430,646 | 7/1995 | Kimura et al. | 701/37 |
| 5,825,284 | 10/1998 | Dunwoody et al. | 340/440 |
| 5,943,634 | 8/1999 | Piety et al. | 702/56 |
| 5,996,409 | 12/1999 | Funk et al. | 73/504.04 |
| 6,002,974 | 12/1999 | Schiffmann | 340/440 |

FOREIGN PATENT DOCUMENTS

| | | |
|---|---|---|
| 0672549 | 9/1995 | European Pat. Off. . |
| 0684150 | 11/1995 | European Pat. Off. . |
| 3907870 | 9/1989 | Germany . |
| 4017256 | 12/1990 | Germany . |
| 4027997 | 3/1991 | Germany . |
| 4217247 | 10/1992 | Germany . |
| 19500800 | 12/1995 | Germany . |
| 62-275813 | 11/1987 | Japan . |
| 4-215513 | 8/1992 | Japan . |
| 7-061221 | 3/1995 | Japan . |
| 9-169205 | 6/1997 | Japan . |
| 10-185661 | 7/1998 | Japan . |
| WO98/25779 | 6/1998 | WIPO . |

*Primary Examiner*—Daniel J. Wu
*Assistant Examiner*—Van T. Trieu
*Attorney, Agent, or Firm*—W. F. Fasse; W. G. Fasse

[57] ABSTRACT

A method and an apparatus determine the frequency or the period of the natural characteristic oscillation of a vehicle, and therefrom determine the mass of the vehicle and provide a warning if a dangerous oscillation condition exists which could lead to a tipping or rollover of the vehicle. The evaluation is carried out while the vehicle is driving. The apparatus includes a sensor such as a rotation rate sensor, a timer, an evaluating unit, and a warning unit. The method involves measuring the time interval between two characteristic features of the oscillation measured by the sensor, such as zero crossings, minimum points or maximum points of the angular velocity of the oscillation, and then calculating the period and/or the frequency of the oscillation from the measured time interval. Then the moment of inertia and/or the mass of the vehicle can be determined from the period or frequency. Also, if the period or frequency is out of a safe range, a warning is triggered to indicate to the driver of the vehicle that a rollover danger exists.

24 Claims, 3 Drawing Sheets

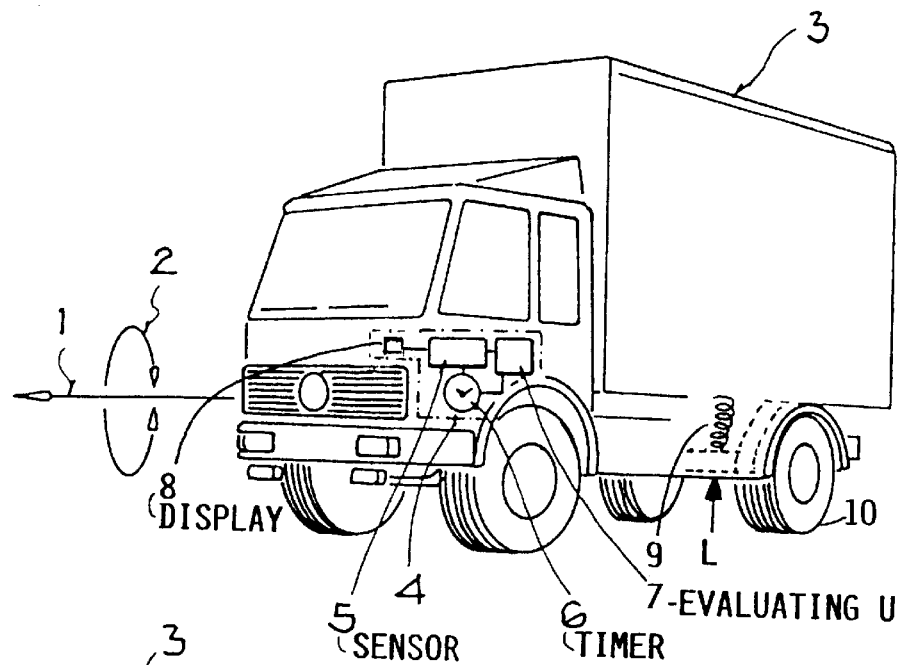
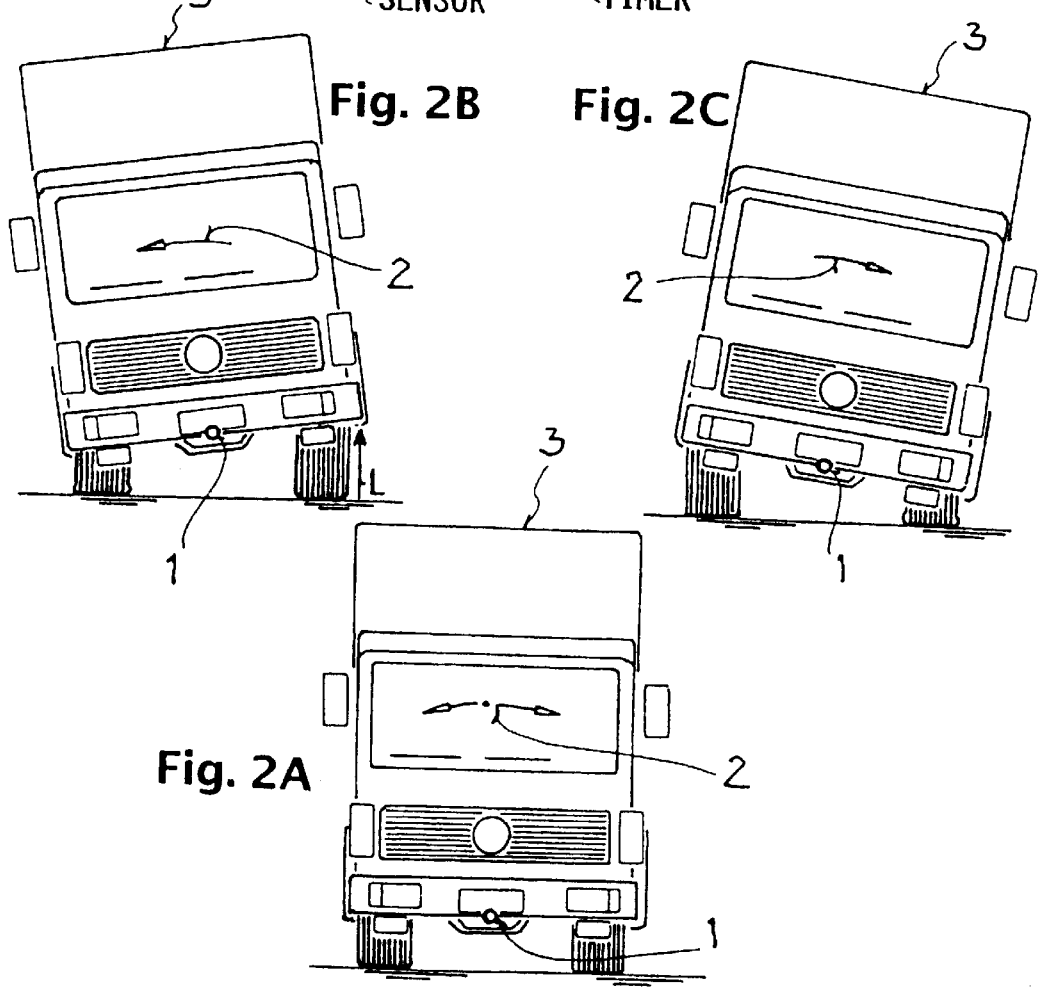

METHOD AND APPARATUS FOR DETERMINING OSCILLATION VALUES AND OTHER VEHICLE-SPECIFIC QUANTITIES OF A VEHICLE

PRIORITY CLAIM

This application is based on and claims the priority under 35 U.S.C. §119 of German Patent Application 198 23 093.1, filed on May 22, 1998, the entire disclosure of which is incorporated herein by reference.

FIELD OF THE INVENTION

The invention relates to a method and an apparatus for determining oscillation values and other vehicle-specific quantities of a vehicle, especially while the vehicle is being driven.

BACKGROUND INFORMATION

Various systems are known for determining the tilt angle or tipping angle of a motor vehicle. For example, German Patent Publication 42 17 247 A1 discloses a system for monitoring the tilt of a motor vehicle, which is intended to prevent the over-turning or tipping-over of the vehicle as a result of a non-uniform loading of the loading surface of the vehicle. A measuring feeler or sensor determines the lengthwise tilt and the crosswise tilt of the vehicle relative to the vertical. The measured values are further processed in an electronic circuit, and the magnitude and direction of the tilt of the vehicle are displayed on a suitable display unit. The measuring unit can also be used for determining acceleration forces, and particularly crosswise accelerations of the vehicle, which can be a decisive factor affecting the driving stability of the vehicle. In this context, the measuring feeler or sensor acts as a centrifugal pendulum sensor.

In the above described known system it is disadvantageous that the true or actual tilting angle and tilting tendency of the vehicle cannot be determined using such a pendulum sensor. Namely, the pendulum sensor is only able to measure tilt angles relative to the apparent vertical, which does not always correspond to the true vertical, because the apparent vertical will be influenced by centrifugal forces that arise while the vehicle is driving around a curve, for example.

Various different apparatus, for example those using a rotation rate sensor such as a yaw rate sensor are also known for detecting the angular velocity and especially the rotation velocity about the lengthwise axis of the vehicle. Such apparatus are typically used as roll-over sensor systems which trigger a safety system such as a deployable roll bar or an airbag when the rotational velocity about the lengthwise axis of the vehicle reaches a maximum allowable value. For example, German Patent Publication 195 00 800 A1 discloses a system including a Coriolis rotation rate sensor including a seismic mass which is spring-supported on a substrate and which is therefore deflectable as a result of acceleration influences, as well as evaluation circuitry for determining a corresponding Coriolis acceleration. It is a disadvantage in such systems that only the magnitude of the angular velocity, i.e. the rotation velocity about the tilt axis, is determined. Once the magnitude of the rotation velocity has reached or exceeded a critical maximum value, a safety system is triggered. The system does not provide an advance warning to the driver of the vehicle, in sufficient time for the driver to take actions to avoid the rollover danger. Thus, the driver cannot actively counteract an imminent rollover condition, nor can a potentially dangerous loading condition of the vehicle be recognized, indicated and corrected before it results in a rollover condition, using such a system. Moreover, such systems cannot carry out a determination of the mass of the vehicle.

SUMMARY OF THE INVENTION

In view of the above, it is an object of the invention to provide a method and an apparatus for determining oscillation values or parameters as well as other vehicle-specific values of a motor vehicle, especially so that a dangerous loading condition can be recognized and indicated and a potentially dangerous oscillating condition of the vehicle can be recognized and indicated before an imminent rollover situation arises. In this manner, the driver of the vehicle can take the appropriate corrective actions before a rollover accident occurs. The invention further aims to avoid or overcome the disadvantages of the prior art, and to achieve additional advantages, as apparent from the present specification.

The above objects have been achieved in a method according to the invention, for determining oscillation values and other vehicle-specific values, especially the moment of inertia in the longitudinal direction, the mass, as well as a tipping tendency of the vehicle. The inventive method involves sensing and evaluating the time progression of the natural characteristic oscillation of the vehicle, especially as represented by time-based quantities such as the natural characteristic frequency, i.e. the Eigenfrequency, or the natural characteristic oscillation period, i.e. the Eigenperiod, about the lengthwise axis of the vehicle. This is especially carried out while the vehicle is driving.

By sensing and evaluating the time progression of the natural characteristic oscillation of the vehicle, it is possible to accurately and unambiguously calculate the time-based oscillation quantities (e.g. the frequency or the period) and other vehicle-specific values such as the mass and the tipping tendency of the vehicle, whereby the tipping or rollover danger can be reliably estimated and predicted. The time progression or variation of the natural characteristic oscillation is determined by using a sensor to detect at least two characteristic features of the oscillation (such as two absolute or relative amplitude values of an oscillation parameter such as the angular velocity), measuring the time interval between these two characteristic features using a timer, and from this time interval calculating the characteristic oscillation period and accordingly the characteristic frequency of the vehicle using a suitable evaluating unit.

The above objects have thus further been achieved in an apparatus according to the invention comprising at least one sensor adapted to detect at least one characteristic feature of the oscillation of the vehicle, such as at least one absolute or relative amplitude value, particularly a zero point or sign reversal, a maximum value, or a minimum value of a parameter such as the angular velocity of the oscillation. The apparatus further comprises a timer, such as a timer clock circuit adapted to measure the time interval between two successive ones of the characteristic features of the oscillation, and particularly two of the same type of values, e.g. maximum values. The apparatus further comprises an evaluating unit adapted to calculate a time-based quantity such as the frequency or period of the time progression of the characteristic oscillation, as well as other values such as the moment of inertia and mass of the vehicle, using the information provided by the sensor and the timer, and to determine whether a dangerous oscillation condition exists and to responsively provide a corresponding warning indication. The evaluating unit can be considered as also carrying out the measuring of the time interval as mentioned above, if the timer is considered as simply a circuit providing clock signal information.

The time progression of the characteristic oscillation can be evaluated as a continuous time-varying curve, or can be evaluated as discrete values along the continuous time varying curve, or simply as values indicative of the calculated characteristic frequency or characteristic period.

It is an advantage achieved by the invention, that once the time progression of the natural characteristic oscillation of the vehicle has been determined, it is possible to further determine or derive substantially more information in comparison to the simpler prior art measurement of only a magnitude of a single condition or currently existing parameter value. Particularly according to the invention, it is possible to determine various information such as the mass of the vehicle, and the further characteristic behavior of the vehicle in a particular loading condition can be estimated and predicted once the time progression of the natural characteristic oscillation of the vehicle in this loading condition has been determined. In the inventive measurement of time-related values such as the frequency or the period of the oscillation, future values can be at least approximately pre-calculated or predicted, whereas this is not the case for a pure amplitude magnitude measurement.

According to further preferred features of the invention, the mass or loading condition of the motor vehicle can be determined while the vehicle is driving. It is also possible to predict and indicate to the driver of the vehicle whether or not the vehicle is in danger of tipping over, i.e. whether or not a dangerous oscillation condition exists that is likely to lead to a rollover accident. Such an indication or advance warning can be given with sufficient time for the driver to take countermeasures in order to prevent a tipping or rolling over of the vehicle.

BRIEF DESCRIPTION OF THE DRAWINGS

In order that the invention may be clearly understood it will now be described in connection with example embodiments, with reference to the accompanying drawings, wherein:

FIG. 1 is a perspective view of a cargo truck schematically illustrating a block diagram of an apparatus according to the invention installed therein;

FIG. 2A is a front view of the truck in a non-tilting position;

FIG. 2B is a front view showing the truck tilting to its right, i.e. the left of the figure;

FIG. 2C is a front view showing the truck tilting to its left, i.e. the right of the figure;

Figure 3:
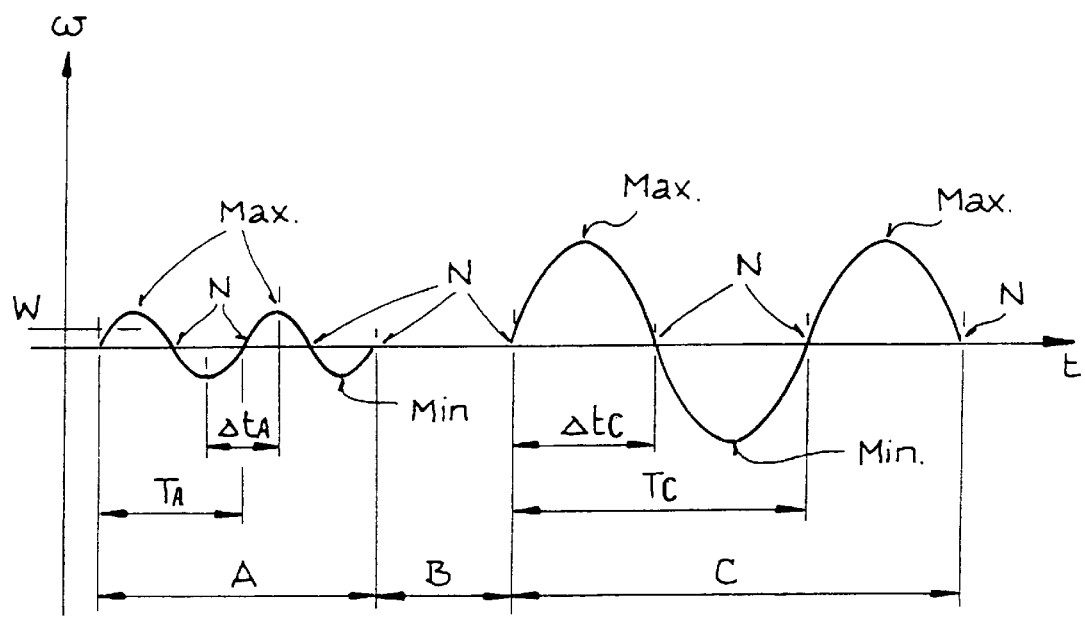
FIG. 3 is a diagram showing the angular velocity of the oscillation of the truck as a function of time.

DETAILED DESCRIPTION OF PREFERRED EXAMPLE EMBODIMENTS AND OF THE BEST MODE OF THE INVENTION

FIG. 1 shows a cargo truck 3 as a representative example of a vehicle to which the inventive method and apparatus can be applied. However, it should be understood that the present invention similarly applies to any other type of vehicle including trucks, automobiles, trailers, semi-trailers, railroad cars, ships and the like.

As the truck 3 drives along a roadway, the truck will undergo a natural characteristic oscillation or swaying about its longitudinal axis 1 as illustrated by the rotation arrow 2. Generally the "longitudinal axis" as referred to herein will be the lengthwise axis or the fore-and-aft axis of the vehicle, but may be any axis about which a potentially dangerous swaying may occur, such as a vertical hitch axis of a trailer. The frequency of this natural characteristic oscillation, i.e. the Eigen-frequency or natural characteristic frequency $f_n$, is dependent on the torsional spring stiffness or spring constant $D_T$ of the chassis springs 9 and of the tires 10 of the truck 3 about the axis 1, as well as the moment of inertia I of the truck 3 with respect to the axis 1.

The natural characteristic frequency $f_n$ is not dependent on the damping rate or other factors of the shock absorbers of the vehicle. Particularly, while the shock absorbers will have an effect on the damping or decay rate of the amplitude of the natural characteristic oscillation, the shock absorbers will not influence the frequency of the natural characteristic oscillation. Moreover, the natural characteristic frequency $f_n$ is not dependent on the condition of the road on which the truck 3 is driving, beyond the fact that the bumps or unevenness in the roadway will excite the oscillation or swaying 2 of the truck 3, but this oscillation will always occur at the natural characteristic frequency $f_n$ of the truck 3. Thus, it is apparent that the natural characteristic frequency $f_n$ is a characteristic of the particular truck 3 in its particular existing loading condition, and is not influenced by external factors.

The natural characteristic frequency $f_n$ is also referred to as the tilting frequency of the vehicle, and the speed or rate at which the oscillations proceed is referred to as the tilting rate. If the tilting rate of a particular vehicle in a particular loading condition is known or calculable in advance, then it is possible to predict or pre-estimate the probability of the vehicle tipping or rolling over, as described in detail below.

As generally discussed above, the natural characteristic frequency $f_n$ is dependent upon the torsional spring stiffness $D_T$ of the vehicle as well as the areal moment of inertia I with respect to the longitudinal axis 1 of the truck 3. More particularly, this can be mathematically represented as follows:

$$f_n \cong \sqrt{\frac{D_T}{I}}$$

This moment of inertia I is determined by the mass m of the vehicle and by the location of the center of gravity of the truck 3. If the location of the center of gravity in a given case is known, then the moment of inertia I is directly related to the mass m, so that the mass m of the truck 3 can be determined from the natural characteristic frequency $f_n$ once the torsional spring stiffness $D_T$ as well as the location of the center of gravity are known, as discussed in detail below.

For any given vehicle such as a truck 3, the location of the center of gravity is known or can be determined for the unloaded truck 3 and forever remains an essentially constant characteristic of the unloaded truck. While the arrangement of a load in the cargo area of the truck 3 will clearly affect the gross mass m of the truck, the load distribution or arrangement will not significantly influence the location of the overall center of gravity of the truck 3 as long as the applicable loading restrictions are observed. Thus, assuming that any load in the truck 3 has been arranged or distributed in accordance with the applicable loading restrictions, it can safely be assumed that the center of gravity of the truck 3 is substantially independent of the loading condition. As an alternative, it is possible to pre-specify a nominal center of gravity for the unloaded truck, another center of gravity for a half-loaded truck, and another center of gravity for the fully loaded truck, for example. In any event, as long as the loading restrictions are observed, the center of gravity of the truck 3 can be pre-specified. Because of this, the mass of the truck can be calculated, and also it is possible to prevent a disadvantageous arrangement of a load causing the effect of a higher mass which would increase the likelihood of the loaded vehicle tipping or rolling over.

As is further schematically indicated by a block circuit diagram in FIG. 1, the truck 3 includes an apparatus 4 for determining the time progression of the natural characteristic oscillation of the truck 3, according to the invention. The apparatus or circuit arrangement 4 includes a rollover sensor 5 which may be a conventional rollover sensor as is typically used in cabriolets or convertibles for activating the deployment of a rollbar or the like when a rollover occurs. Such rollover sensors 5 always only detect a deflection, i.e. a momentary or instantaneously existing value of a quantity such as a velocity, which constantly varies during the oscillation, because it is dependent on the amplitude of the oscillation. Thus, by itself, the rollover sensor 5 cannot provide all the necessary information for the inventive method and apparatus. For this reason, the apparatus 4 further comprises a timing clock or timer 6 and an evaluating unit 7, by means of which the period, the frequency, or other time-based quantities that characterize the time progression of the natural characteristic oscillation, are determined.

The rollover sensor 5 detects at least two characteristic features of the oscillation that is being measured. In this context, each of the characteristic features may be a zero crossing or sign reversal, a maximum deflection value, or a minimum deflection value, or any other characteristic feature of a time-varying parameter of the oscillation 2 about the lengthwise axis 1 of the truck 3 that is detectable by the rollover sensor 5. The invention can be carried out regardless of the particular type or types of the two characteristic features. It is only important in this context that it is known what fractional portion or multiple of the period of the oscillation occurs between the two characteristic features. For example, if the two characteristic features are zero crossings or sign reversals, then it is known that the time interval between these two characteristic features corresponds to one half of the period of the oscillation. As a further example, if the characteristic features are two maximum values or two minimum values of the oscillation, then the time interval between the two respective characteristic features will correspond to a full period of the oscillation. This is shown in detail in FIG. 3 and will be discussed below.

The timer 6 measures the time interval between the occurrence of the two characteristic features detected by the sensor 5. Stated differently, the timer 6 provides timing information to the evaluating unit 7, which then measures the corresponding time interval. The evaluating unit 7 next calculates the natural characteristic frequency or the corresponding characteristic period from the time interval between the two characteristic features and the known fractional portion or multiple of the period corresponding to the time-spacing of the two characteristic features. Further functions of the evaluating unit 7 will be discussed below.

As the evaluating unit 7 receives the continuously or discretely detected values of the oscillation from the rollover sensor 5 as well as the timing information from the timer 6, the evaluating unit can calculate and predict the expected progression of the natural characteristic oscillation for the following oscillation cycles. Particularly, by determining the frequency or period of the natural characteristic oscillation of the truck 3, which is a fixed characteristic of the truck and its particular loading condition, it is possible to identify a potentially dangerous natural characteristic oscillation soon after the truck 3 begins driving with a particular load, and long before this dangerous oscillation characteristic actually leads to a tipping accident. Thus, the inventive apparatus 4 is able to make predictions and give an indication of the likelihood of the tipping of the truck 3, so that the driver has sufficient time before the occurrence of a tipping accident to take proper avoidance or corrective measures such as changing the loading of the truck. To give such an indication to the driver, the apparatus 4 further includes a warning unit 8 which may be an alphanumeric or graphical display, an analog indicator gage, a warning light, or an audible warning tone such as a buzzer or chime.

As has been generally mentioned above, it is possible to determine the mass m of the loaded truck 3 while it is driving, based on the determined natural characteristic frequency $f_n$ or another corresponding value such as the period or the like which is proportional to the frequency $f_n$, and the known torsional spring characteristic $D_T$. Particularly, in the above equation $$f_n \cong \sqrt{\frac{D_T}{I}}$$

it is further known that I≅m, i.e. the moment of inertial I is directly related to and proportional to the mass m as long as the center of gravity of the loaded truck 3 is known, which is the case as long as the applicable loading restrictions have been observed.

Present day sensors that can be used for the rollover sensor 5, such as yaw rate sensors and roll rate sensors for example, are very sensitive, precise and accurate, and are therefore able to measure even small movements. The Eigenfrequency or natural characteristic frequency of the truck 3 is a fixed characteristic of the truck and is independent of the external stimulation or excitation of the oscillation caused by the roadway, for example. Thus, the natural characteristic frequency can readily be determined even for small amplitude oscillations that arise in normal driving operation of the vehicle, already soon after the vehicle begins driving. Correspondingly, once the natural characteristic frequency is determined, it can be used to determine the mass of the vehicle, soon after the vehicle starts driving. Since the natural characteristic frequency is a fixed or constant value for a given loading condition of a given vehicle, and will only be varied due to a change of the mass of the loaded vehicle, it is already possible to determine the mass from a very small excitation of oscillations as soon as the vehicle starts driving.

As an alternative, the inventive method can be carried out without driving the truck, but instead by applying a torsional test load L to the truck so as to cause it to oscillate with its characteristic frequency. This can be achieved by momentarily torsionally pushing against or lifting one side of the body of the truck with a hydraulic or pneumatic jack or the like to cause the truck to sway. Once the truck sways with its characteristic oscillation, the evaluations according to the invention can be carried out.

The inventive method and apparatus is shown in FIG. 1 in connection with a one-piece truck, but it is similarly applicable for determining the time progression of the natural characteristic oscillation of trailers or coupled semi-trailer systems. For example, in connection with a semi-trailer tractor rig, at least the sensor 5 of the present apparatus 4 is preferably arranged on the semi-trailer rather than on the tractor, because the mass and loading condition of the tractor itself remains substantially constant, while the loading condition of the semi-trailer will be repeatedly changed and different semi-trailers will be coupled to the tractor at different times. Thus, it is more important to determine the natural characteristic oscillation of the semi-trailer for any particular loading condition, and to indicate to the driver of the vehicle if a potentially dangerous oscillation condition exists. In any event, the particular sensor should always be tuned to the construction and characteristics of the particular vehicle in which it is installed. In other words, the sensitivity, precision, operational frequency range, and the like of the sensor should be properly matched to the expected range of oscillations of the particular vehicle. Thus, for two different vehicles, it is expected that two different sensors would be adaptively used, while the remaining components and circuitry of the present apparatus can remain substantially the same.

FIG. 2 shows the oscillation 2 of the truck 3 about the longitudinal axis 1 in a front view. For the purpose of enhanced illustration, the magnitude of the oscillation 2 is shown in an exaggerated manner. Normally, the natural characteristic oscillation of the vehicle 3 will not be apparent to the eye. However, the rotation rate sensor 5 of the inventive apparatus is able to detect even the smallest deflections or deviations, for example variations in the angular velocity of the oscillating motion of the vehicle, with great accuracy, so that the natural characteristic frequency $f_n$ can be determined using the timer 6 and the evaluating unit 7 as shown in FIG. 1 and described above, even for oscillations of which the magnitude is too small to be visually apparent.

FIG. 3 shows a representative example of the time progression or course of the natural characteristic oscillation 2 of the truck 3 about its lengthwise axis 1. Note that the diagram shows a relatively clean sinusoidal oscillation, from which modes of oscillation other than the primary characteristic oscillation as well as minor perturbations and vibrations have been omitted. The evaluating unit 7 may carry out a corresponding filtering to remove oscillations and vibrations having frequencies outside of the expected range of the natural characteristic frequency, to the extent necessary for a proper evaluation of the oscillation as described herein.

Moreover, the present schematic diagram of FIG. 3 shows the complete or continuous curve of the oscillation progression, whereby a respective amplitude value is allocated to each respective point in time. However, it is not necessary according to the invention that each pair of values, i.e. a corresponding amplitude at every time, must be individually and continuously measured and evaluated. Instead, the oscillation can be evaluated discretely at successive time intervals, whereby it is especially significant to measure and evaluate only a few important points along the course of the oscillation. In this con- text, it is especially significant to detect at least two successive characteristic features of the oscillation, which may be any of a zero crossing or sign reversal N, a maximum point Max, a minimum point Min, or any other desired detectable characteristic value W that can be detected by the rollover sensor 5. It is irrelevant to the successful operation of the inventive method what particular feature or features are selected as characteristic features, as long as it is known what fraction or what multiple of a period of the oscillation corresponds to the time interval between the two successive characteristic features. For example, if two successive zero crossings or sign reversals N are taken as the two characteristic features, then the time interval between these two characteristic features corresponds to one half of the period of the oscillation. As a further example, if two maximum points Max or two minimum points Min are taken as the characteristic features, then the time interval between these features will correspond to a complete period of the oscillation. This time interval factor is then used to calculate the natural characteristic period from the measured time interval.

FIG. 3 shows three distinct representative example time segments A, B and C. In the first time segment A, the truck 3 is driving with a first particular load condition. In the second time segment B, the truck 3 is at a standstill, and is being unloaded and reloaded with a new load for example. During the third time segment C, the truck is again driving with the new load condition, so that it exhibits a different natural characteristic frequency.

In the present example embodiment, the rollover sensor 5 is a rotation rate sensor which particularly measures the angular velocity ω as a time-varying parameter characterizing the oscillation. Thus, it is important to recognize that the diagram of FIG. 3 does not show the amplitude of the oscillation itself, but the measured angular velocity ω is indicative of the amplitude of the oscillation. Namely, the angular velocity and the amplitude of the oscillation are inversely proportional to each other. Particularly, the points of maximum amplitude of the oscillation correspond to zero crossings of the angular velocity ω shown in FIG. 3. From another point of view, when the angular velocity ω is equal to 0, then the vehicle is either at a maximum deflection in its oscillation at which point the oscillating motion will reverse in the other direction (e.g. during time segments A and C), or the vehicle is at a standstill (e.g. during time segment B). As an alternative, the actual amplitude of the oscillation could be used as the time-varying parameter in the inventive method.

During time segment B, the inventive apparatus can determine that the vehicle is at rest, either based on input from the speedometer of the vehicle for example, or because the angular velocity ω will constantly remain 0. During time segment A, the evaluating unit 7 will evaluate the signal provided by the sensor 5 in connection with the timing information provided by the timer 6 to measure the time interval $\Delta t_A$ between the two characteristic features, which are the minimum value Min and the maximum value Max of the angular velocity ω. The time interval $\Delta t_A$ measured between the minimum point Min and the maximum point Max corresponds to half of one period $T_A$ of the natural characteristic oscillation during time segment A, i.e. for the loading condition existing during this time segment. Then, the natural characteristic frequency $f_A$ of the oscillation for this loading condition is calculated as the reciprocal or inverse value of the period $T_A$. As has been described above, the moment of inertia and therefrom the mass $m_A$ of the loaded truck 3 is next calculated from the natural characteristic frequency $f_A$. Since the natural characteristic oscillation remains constant for the vehicle with the particular load condition, it is possible to determine and predict the characteristic oscillation of the vehicle for the entire time segment A, soon after the vehicle starts driving. During the time segment C, the period $T_C$ is calculated from the measured time interval $\Delta t_C$ between the two zero points N selected as characteristic features, and the known fact that this time interval represents one half of one cycle of the oscillation. It is apparent that the truck has been loaded with a different loading condition, whereby the period $T_C$ and therewith the natural characteristic frequency $f_C$ of the natural characteristic oscillation of the vehicle have changed in comparison to the corresponding values pertaining during the first time segment A. Assuming that the torsional spring stiffness $D_T$ of the truck has remained the same, it can further be assumed that the change in the oscillation parameters was caused by a different moment of inertia I resulting from a different load condition in the truck, which would result if the mass and/or the center of gravity of the loaded truck has changed. As long as the loading restrictions have been observed, it can be assumed that the center of gravity has not significantly changed, so that the change in the characteristic oscillation has been caused by a different loaded mass of the truck.

In any event, it is possible to exactly determine the mass of the loaded truck. If the loading restrictions have been observed and thus the center of gravity has not significantly changed, or at least the center of gravity is known for a particular loading condition, and for a known torsional spring stiffness $D_T$, it is possible to determine the loaded mass $m_C$ of the loaded vehicle as it is driving. This determination of the mass is independent of external factors such as the road conditions, because such external factors do not have an influence on the natural characteristic frequency of the vehicle, as discussed above.

Due to the longer oscillation period $T_C$ that prevails during the time segment C, it is also apparent that the tipping or rollover danger has increased, because each oscillation cycle has a longer duration and can thereby traverse a longer path distance, such that the amplitude of the oscillation can become larger. It is important to note, however, that it is not necessary to detect or measure the maximum amplitude of the oscillation itself, according to the invention. Instead, it is only important to measure and evaluate the frequency and/or period of the natural characteristic oscillation according to the invention.

For the sake of simplicity in the illustration, no oscillations have been shown during the time segment B while the truck is at a standstill, and the oscillations from the time segment A have abruptly terminated. Actually, however, there would be a decaying transient of the oscillations from the time segment A into the time segment B. The rate of decay of the oscillations is dependent on the damping provided by the shock absorbers of the vehicle, for example. Similarly, the onset or initial transient as well as the decay transient behavior of the oscillation have not been taken into account or illustrated during the time segment C. Namely, for simplicity, the oscillation has been illustrated as abruptly beginning at the transition from time segment B to time segment C and abruptly terminating at the end of time segment C. While the damping transients do not need to be taken into account according to the invention, they can be taken into account in the calculations carried out by an intelligent evaluating unit 7. Particularly, the damping characteristics can be taken into account for calculating the future probability of a rollover condition. Because the damping factor will tend to damp out the excitation of the natural characteristic oscillation by external influences such as bumps or unevenness in the roadway, the damping characteristic will make it less likely that a dangerously high amplitude of oscillation will be excited even when a dangerous oscillation frequency prevails.

The evaluating unit 7 can further store at least partial or complete curves of data representing possible natural characteristic oscillations of the vehicle. For a particular vehicle with a particular loading condition, namely a determined mass or a known moment of inertia, there is a limited number of the possible oscillation curves made up of data representing a certain relationship between the frequency and the amplitude of the oscillation. For a given vehicle, if the amplitude of the oscillations exceeds a certain threshold value, then the vehicle will tip or roll over. Accordingly, since the frequency of the oscillation is linked to the maximum amplitude of the oscillation, it can thus also be specified that if the period of the natural characteristic oscillation exceeds a certain threshold, or the frequency of the natural characteristic oscillation falls below a certain threshold, then the vehicle will be likely to tip or roll over. Accordingly, by comparing the respective oscillation frequency determined for a particular loading condition of the vehicle with a prescribed safe frequency threshold value, the evaluating unit 7 is able to determine and indicate when a dangerous oscillation condition exists and thus warn the driver via the warning unit 8 that a corrective measure must be taken to avoid a rollover danger.

Figure 4:
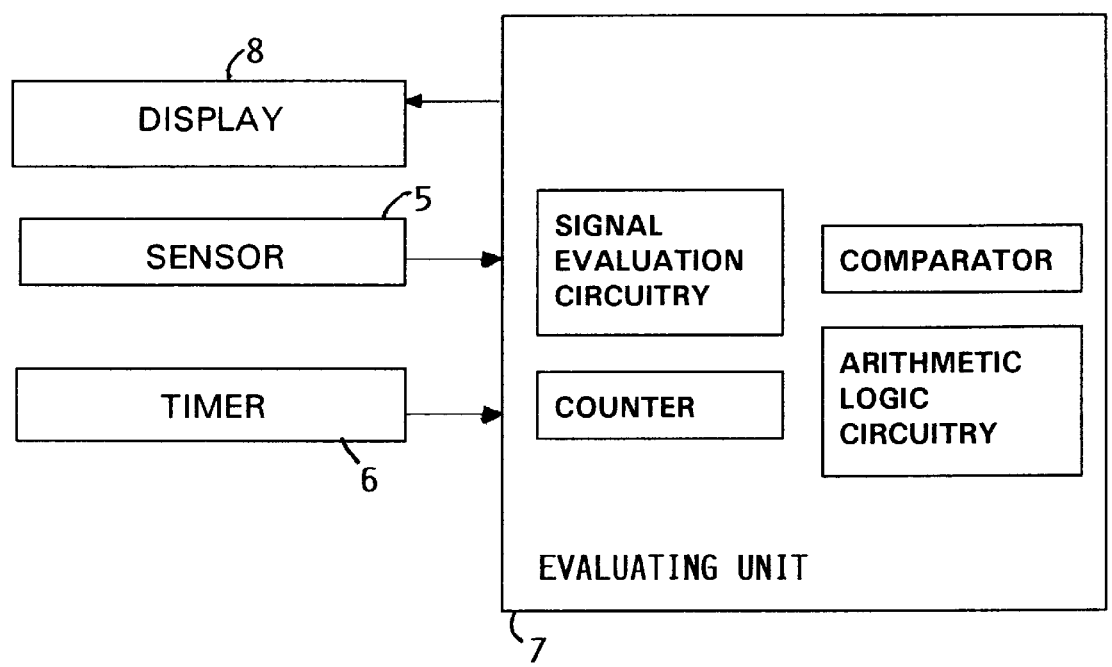
FIG. 4 is a schematic block diagram of an example of circuit components of the evaluating unit according to the invention.

The evaluating unit 7 can comprise any known circuit arrangement that is able to carry out the calculations and comparisons of the inventive method as described herein. For example, as shown schematically in FIG. 4, the evaluating unit may comprise signal evaluation circuitry adapted to recognize the characteristic features of the time varying parameter selected from the group consisting of a zero-crossing, a maximum value and a minimum value of the time-varying parameter, a counter adapted to count the timing signal to determine the time interval between two successive ones of the characteristic features, arithmetic logic circuitry adapted to calculate a time-based quantity selected from a natural characteristic frequency and a natural characteristic period of the oscillation from the time interval, and at least one comparator adapted to compare the time-based quantity with a threshold value. Similarly, the timer 6 and the sensor 5 can comprise any known components or circuits that are able to carry out the functions and steps as described herein. A person of ordinary skill in the art will readily be able to embody such circuits in various configurations as needed for any particular application.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for evaluating a tilting oscillation of a vehicle, comprising the following steps:
   a) causing said vehicle to oscillate with a natural characteristic oscillation of said vehicle about a longitudinal axis of said vehicle;
   b) sensing a representative time-varying parameter of said oscillation over time; and
   c) evaluating said time-varying parameter relative to time so as to determine a time-based quantity that comprises at least one of a natural characteristic frequency of said oscillation and a natural characteristic period of said oscillation, and that is characteristic of a time progression of said oscillation over time.

2. The method according to claim 1, wherein said step a) comprises driving said vehicle so as to cause said vehicle to oscillate with said natural characteristic oscillation.

3. The method according to claim 1, wherein said step a) comprises applying a torsional test load to said vehicle about said longitudinal axis so as to cause said vehicle to oscillate with said natural characteristic oscillation.

4. The method according to claim 1, wherein said time-varying parameter comprises an angular velocity of said oscillation.

5. The method according to claim 1, wherein said time-varying parameter comprises an amplitude of said oscillation.

6. The method according to claim 1, wherein said step b) comprises detecting at least two characteristic features of said time-varying parameter of said oscillation over time, wherein said characteristic features are each respectively selected from the group consisting of sign reversals of said time-varying parameter, maximum values of said time-varying parameter, and minimum values of said time-varying parameter, and wherein said step c) comprises measuring a time interval between said two characteristic features and calculating said time-based quantity from said time interval.

7. The method according to claim 6, wherein said two characteristic features both respectively comprise said sign reversals, or both respectively comprise said maximum values, or both respectively comprise said minimum values.

8. The method according to claim 6, wherein said time-varying parameter comprises an angular velocity of said oscillation.

9. The method according to claim 1, further comprising comparing said time-based quantity to an acceptable threshold value and triggering a warning indicator if said time-based quantity is beyond said threshold value.

10. The method according to claim 1, further comprising continuously providing a visual display representative of said time-based quantity.

11. The method according to claim 1, further comprising calculating a moment of inertia of said vehicle with respect to said longitudinal axis based on said time-based quantity and a value representing a torsional spring stiffness of said vehicle about said longitudinal axis.

12. The method according to claim 11, further comprising calculating a gross mass of said vehicle based on said moment of inertia and data representing a center of gravity of said vehicle about said longitudinal axis.

13. The method according to claim 12, further comprising displaying or recording data corresponding to said gross mass.

14. The method according to claim 1, further comprising storing first data representing a torsional spring stiffness of said vehicle about said longitudinal axis and second data representing a center of gravity of said vehicle about said longitudinal axis, and using said first and second data to calculate a gross mass of said vehicle.

15. The method according to claim 1, further comprising storing data representing a torsional damping characteristic of said vehicle about said longitudinal axis.

16. The method according to claim 1, excluding a step of measuring a magnitude of an amplitude of said oscillation, and excluding a step of releasing a signal when a magnitude of an amplitude of said oscillation exceeds a threshold value.

17. The method according to claim 1, further comprising calculating a moment of inertia of said vehicle with respect to said longitudinal axis dependent on said determined time-based quantity.

18. The method according to claim 1, further comprising calculating a gross mass of said vehicle dependent on said determined time-based quantity.

19. The method according to claim 1, further comprising determining a tendency of said vehicle to tilt about said longitudinal axis based on said time-based quantity and irrespective of an actually existing degree of tilt of said vehicle about said longitudinal axis.

20. The method according to claim 1, wherein said time over which said step b) is carried out is at least one quarter of one cycle of said natural characteristic oscillation of said vehicle.

21. An arrangement for evaluating a tilting oscillation of a vehicle, comprising:

a rotation rate sensor adapted to sense a time-varying parameter of an oscillation of a vehicle about a lengthwise axis of said vehicle;

a timer adapted to provide a timing signal; and an evaluating circuit connected by signal conductors with said sensor and said timer, and adapted to measure a time interval between two characteristic features of said time-varying parameter sensed by said sensor based on said timing signal provided by said timer, and adapted to determine at least one of a natural characteristic frequency of said oscillation and a natural characteristic period of said oscillation.

22. The arrangement according to claim 21, further comprising at least one of a visual indicator and an audible indicator connected to said evaluating circuit.

23. The arrangement according to claim 21, wherein said evaluating circuit comprises signal evaluation circuitry adapted to recognize said characteristic features of said time varying parameter selected from the group consisting of a zero-crossing, a maximum value and a minimum value of said time-varying parameter, a counter adapted to count said timing signal to determine said time interval between two successive ones of said characteristic features, arithmetic logic circuitry adapted to calculate a time-based quantity selected from a natural characteristic frequency and a natural characteristic period of said oscillation from said time interval, and at least one comparator adapted to compare said time-based quantity with a threshold value.

24. The arrangement according to claim 21, in combination with said vehicle, wherein said vehicle comprises a tractor-trailer rig including a tractor and a semi-trailer, and wherein at least said sensor is installed in or on said semi-trailer.

* * * * *